INVENTOR
Horst JAHNKE

United States Patent Office 3,773,878
Patented Nov. 20, 1973

3,773,878
METHOD OF PRODUCING SELF-BREATHING COMPOSITE ELECTRODE FOR FUEL CELLS
Horst Jahnke, Gerlingen, Germany, assignor to Robert Bosch GmbH, Stuttgart, Germany
Filed Feb. 16, 1971, Ser. No. 115,784
Claims priority, application Germany, July 7, 1967, P 16 71 711.6
Int. Cl. B29d 27/00; H01m 27/04
U.S. Cl. 264—49        9 Claims

ABSTRACT OF THE DISCLOSURE

A catalyst is first formed by combining polyparaphenyl or a cobalt-, copper-, nickel- or iron-phthalocyanine with a finely divided carbonaceous conductor. This catalyst is then mixed with a pulverulent organic polymeric binder and a pore-forming agent. The mixture is compressed into a compact structure and a uniform layer of a pulverulent hydrophobic polymer is applied to one major face of said structure, followed by sintering and dissolving the pore-forming agent out of the product. A porous electrode is obtained having one hydrophilic and one hydrophobic major face. The porous electrode thus obtained has a hydrophilic and a hydrophobic major face and is suited for use in a fuel cell which is operated with an acid electrolyte, the hydrophilic face being in contact with the electrolyte and the hydrophobic face being exposed to the air.

CROSS-REFERENCES TO RELATED APPLICATIONS

This application is a division of application Ser. No. 816,847, filed by the same inventor in respect of "Electrode For Fuel Cells and Method of Producing the Same," filed July 8, 1968, and now abandoned.

BACKGROUND OF THE INVENTION

The present invention relates to a process of making electrodes for use in fuel cells, and more particularly to making electrodes for use as a means for effecting electrochemical reduction of atmospheric oxygen in fuel cells which employ an acid electrolyte.

In electrochemical fuel cells, chemical combustion energy of fuels is converted directly into electrical energy. Hydrogen, hydrazine, alcohols as well as saturated and unsaturated hydrocarbons are particularly suited for use as fuels in such cells. Combustion of alcohols and hydrocarbons produces water and carbon dioxide which latter consumes electrolyte and causes a drop in output by increasing the internal resistances of fuel cells which utilize alkaline electrolyte. Therefore, it is desirable to employ an acid electrolyte when the fuel is alcohol or a hydrocarbon; carbon dioxide then escapes in gaseous state.

In such cells, the cathode is operated with oxygen or with substances which release oxygen, for example, hydrogen superoxide. In other words, substances used to operate the cathode must be produced and cleaned in a separate process so that the oxygen furnished thereby is quite expensive. Furthermore, an oxidizing agent must be carried along when the fuel cell is used in a portable or transferable unit.

It is also known to supply the cathode of a fuel cell with oxygen which is contained in the atmosphere. However, voltages furnished by conventional cells using atmospheric oxygen are rather low, i.e., much lower than those furnished by cells which employ pure oxygen. Moreover, a substantial amount of energy furnished by such cells is used up for pumping air to the cathode since the air must be supplied at superatmospheric pressure. This is desirable in order to prevent penetration of electrolyte through the air-breathing electrode. The quantity of energy which is used up for pumping of air is rather high for the additional reason that the cathode must receive an excess of air and that such air must be forced through the cathode in order to avoid the formation of a nitrogen cushion in the cathode.

SUMMARY OF THE INVENTION

It is an object of my invention to provide a method of making air-breathing oxygen electrode for use in fuel cells which contain an acid electrolyte and to produce parts of such electrode of inexpensive semiconductive organic materials.

Another object of the invention is to provide a method of making an air-breathing electrode which withdraws and reduces oxygen from surrounding air at a rate depending on the electrochemical loading and which discharges electrons into such oxygen.

A further object of the invention is to provide for a method of making an electrode which can operate properly at normal atmospheric pressure.

The improved air-breathing electrode comprises a porous hydrophilic first part which is to be placed into contact with acid electrolyte in a fuel cell and contains an organic semiconductive oxygen reduction catalyst, an inert electrically conductive material (e.g., graphite) and an organic binder, and a porous hydrophobic second part which is to be placed into contact with air and comprises a polymeric or monomeric phthalocyanine or a polymeric hydrocarbon with semiconducting characteristics. The binder may be a high-molecular organic material, such as polytetrafluorethylene polyethylene, polyacrylonitrile or polystyrene. The material of the hydrophobic second part may consist of polyethylene polystyrene, polyacrylonitrile or polytetrafluoroethylene. The second part may also contain a pore-forming agent of fine particle size.

In accordance with one feature of my method, the ingredients of the hydrophilic first part are compacted at an elevated pressure, the ingredient or ingredients of the hydrophobic second part are compacted independently of the first part, and the two parts are then bonded to each other by sintering.

In accordance with another feature of the method, the ingredients of both parts are mixed and compacted to form a pressed article which is thereupon sintered to convert it into a porous oxygen electrode which is ready to be used as a cathode in fuel cells employed an acid electrolyte.

The novel features which are considered as characteristic of the invention are set forth in particular in the appended claims. The improved electrode itself, however, both as to its construction and the mode of producing the same, together with additional features and advantages thereof, will be best understood upon perusal of the following detailed description of certain specific embodiments with reference to the accompanying drawings.

BRIEF DESCRIPTION OF THE DRAWING

FIG. 3 is a flow sheet of the process steps involved in the production of electrodes in accordance with this invention.

DESCRIPTION OF THE PREFERRED EMBODIMENTS

Figure 1:
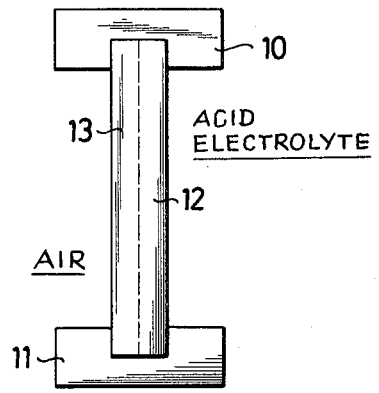
FIG. 1 is a schematic elevational view of an electrode which embodies the invention and is mounted in a fuel cell between two supports.

FIG. 1 illustrates an electrode which embodies the invention. Its ends are held in supports or holders 10, 11 and it comprises two parts or layers, namely, a hydrophilic part 12 which is in contact with acid electrolyte and a hydrophobic part or cover 13. The methods of producing this electrode will be understood with reference to the following examples.

EXAMPLE I 42 grams of cobalt phthalocyanine (consisting of ten parts of phthalodinitrile, two parts of Co(OH)$_2$ in one part of chinoline, and twenty parts of trichlorobenzene) were dissolved in 750 grams of concentrated sulfuric acid in the presence of 54 grams of powdered graphite. On admixture of 5 liters of cold water, the phthalocyanine was precipitated on the graphite powder. The resulting product was filtered and dried in a nitrogen atmosphere at 400° C.

75 grams of the thus obtained mixture of catalyst and carbon were mixed with 45 grams of polytetrafluoro-ethylene binder (with a particle size of 200–500 μm) and with 85 grams of cooking salt (with a particle size of 60–90 μm). The resulting powder was introduced into a form with a cavity of 90 millimeters diameter and was compacted at a pressure of 200 tons. The resulting article was thereupon sprayed with 9.5 grams of polytetrafluoro-ethylene powder (with a particle size of 150–450 uniform thickness. The article was thereupon placed into μm) so that the powder formed on the article a layer of a form and was sintered for 2 hours at a pressure of about 5 kilograms and at a temperature of 400° C. In next step, the salt was dissolved during cooking in distilled water for a period of two hours. The removal of salt produced in the article pores and the resulting electrode was thereupon inserted into a holder or support in such a way that its hydrophilic face faced the electrolyte and that its hydrophobic face was exposed to atmospheric air. The potential between this electrode and a hydrogen reference electrode in 4.5 N H$_2$SO$_4$ at an electrolyte temperature of 70° C. was 720 mv. It will be seen that polytetrafluoro-ethylene was employed as a binder for the catalytic layer and as an ingredient of the hydrophobic part. An important advantage of polytetrafluoroethylene (as a binder for the catalytic layer) is its stability.

EXAMPLE II

It was found that the activity of polymeric phthalocyanines exceeds that of monomeric products. 50 grams of polymeric iron phthalocyanine (produced of 66 grams of pyromellitic acid dianhydride, 14 grams FeCl$_2$, one gram ammonium molybdate and 810 grams urea) were mixed with 64 grams of activated carbon of maximum conductivity ($10^2 \Omega^{-1}$ cm.$^{-1}$), 30 grams of polyethylene powder (180–240 μ) and 65 grams sodium sulfate as pore former. The resulting mixture was compacted at a temperature of 100° C. and at a pressure of 150 tons and yielded an electrode part with a surface area of 46 cm.$^2$. In a parallel operation, there was produced a second pressed article with the same surface area and consisting of a mixture of 11.5 grams polyethylene powder and 3.5 grams sodium sulfate which was compacted at a pressure of 0.5 ton per square centimeter. It will be seen that each part of the electrode contained the same binder (polyethylene powder).

Both parts of the electrode were sintered for five hours at a temperature of 100° C. which resulted in the formation of a strong bond therebetween. The resulting electrode was thereupon mounted in a fuel cell in such a way that one of its sides contacted the electrolyte and that its other side was in contact with air. The electrolyte was a mixture of 6 N H$_2$SO$_4$ with 3 mole of CH$_3$OH. The platinum-containing second electrode was placed at a distance of 2 millimeters from the oxygen electrode to serve as an anode for oxidation of methanol. The oxygen electrode (cathode) withdrew oxygen from air so that, at a temperature of 25° C. and a current density of 42 milliamperes per square centimeter, there developed a voltage of 0.5 volt and a power density of 21 milliwatts per square centimeter.

EXAMPLE III 80 grams of polyparaphenyl, that is a solid compound which consists of a number of benzene rings which are linked together in para-position, with a molecular weight of 3,000 to 5,000 were mixed with 43 grams of an acetogene soot, 37.5 grams polyacrylonitrile powder and 77 grams of sodium chloride, and the resulting mixture was compacted at a pressure of 250 tons. In order to prevent sealing of pores during compacting, a thin layer of pure sodium chloride was added into the form prior and subsequent to application of the catalyst. The sodium chloride layer was dissolved upon completion of the electrode so that the pores in the interior of the electrode were free to communicate with the surrounding atmosphere. The electrode was sprayed with 37 grams of polyacrylonitrile powder and 3 grams sodium chloride (with a particle size of 20–30μ), and was thereupon compressed and sintered.

Figure 2:
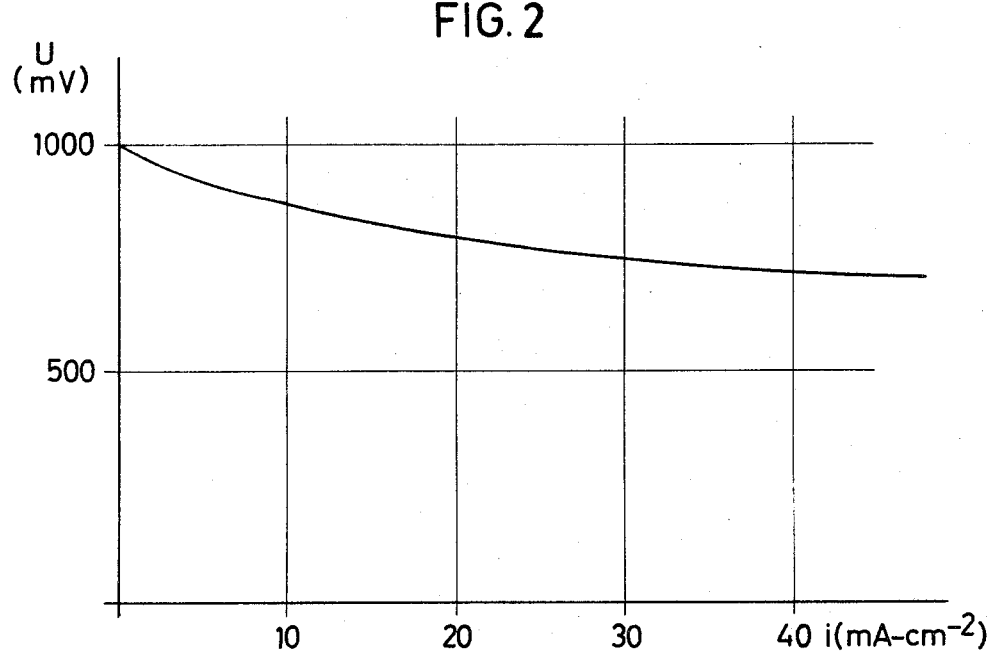
FIG. 2 is a diagram showing the relationship between the potential and current density in a fuel cell employing the improved electrode.

This electrode was operated with air in a half cell. As shown in the diagram of FIG. 2, the potential measured between such electrode and a hydrogen reference electrode in identical solution (4.5 N H$_2$SO$_4$) was determined as a function of current density. At a current density of 20 milliamperes per square centimeter, the potential was 800 millivolts. At a current density of 40 milliamperes, the potential was 720 millivolts.

The aforementioned polyparaphenyl with a molecular weight of 3,000–5,000 can be any one of a group of about 20 different polymeric hydrocarbons each with a different molecular weight. Each of these hydrocarbons can be employed as a catalyst in the hydrophilic part of the electrode.

It will be seen that the improved electrode consists essentially of a hydrophilic and a hydrophobic part. The hydrophylic part contains (a) an organic semiconductive oxygen reduction catalyst, (b) an electrically conductive inert substance (carbon or graphite) and (c) an organic binder, e.g., polytetrafluorethylene, polystyrene, polyacrylonitrile or polyethylene. The hydrophobic part consists of an organic polymeric material. The electrode is employed in fuel cells which contain acid electrolyte.

The semiconductive organic catalyst of the hydrophilic part can consist of (a) monomeric or polymeric phthalocyanines, especially monomeric or polymeric copper-, nickel-, cobalt- or iron-phthalocyanine. Best results were obtained with polymeric phthalocyanines, particularly with iron phthalocyanine. It is also possible to employ semiconductive catalysts consisting of polymeric hydrocarbons (see Example III).

The thickness of the electrode can be in the range of 0.5 to 5 millimeters. The hydrophilic part has a thickness of 0.1 to 3 millimeters and the hydrophobic part has a thickness of 0.4 to 2 millimeters.

The porosity of the electrode depends on the particle size of sodium chloride. Such particle size may be in the range of 60–90μ.

The minimum size of pores is about 20μ and the maximum size about 150μ. Thus, the combined volume of pores in the hydrophilic part of the electrode can vary between 40 and 80 percent of the total volume and is preferably about 60 percent. The combined volume of pores in the hydrophobic part is 30–70 percent, preferably about 50 percent of the total volume. The hydrophilic part can comprise a first portion which is adjacent to the hydrophobic part and is formed with coarse pores and a second portion with fine pores which is adjacent to the electrolyte.

The hydrophobic part of the electrode is exposed to air and comprises one or more organic polymers, for example, polytetrafluoroethylene polystyrene, polyethylene or polyacrylonitrile. The porosity of such organic polymers can be enhanced in a manner as described in the examples, i.e., by addition of pore-forming substances which can be washed or boiled away.

An important advantage of the method (Example II) according to which the two parts of the electrode are produced separately and are thereupon sintered to each other is that each part can be produced at an optimum temperature and/or pressure. However, and in order to prevent the formation of cavities between the two parts during assembly into a single electrode, I often prefer the method which is disclosed in Example I or III, i.e., wherein both parts of the electrode are produced simultaneously. This eliminates the danger of cavity formation even though the method is somewhat more complicated because care must be taken to consider the characteristics of ingredients if the ingredients in one of the parts are not the same as in the other part.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. The process of making a self-breathing composite air electrode for use as a cathode in fuel cells containing an acid electrolyte, the said process comprising combining polyparaphenyl or a cobalt-, copper-, nickel- or iron-phthalocyanine with finely divided carbon, a pulverulent high-molecular organic polymeric binder and an inorganic water-soluble salt as pore-forming agent; then compressing the mixture into a compact structure; applying to one major face of said structure a uniform layer of a pulverulent hydrophobic organic polymer; then sintering the structure; and dissolving the pore-forming agent out of the product prior to or after the said sintering or applying of the hydrophobic polymer, whereby a porous electrode is obtained having one hydrophilic and one hydrophobic major face.

2. The process of claim 1, wherein the phthalocyanine is polymeric phthalocyanine.

3. The process of claim 1, wherein the phthalocyanine is polymeric iron phthalocyanine.

4. The process of claim 3, wherein the polymeric iron phthalocyanine is the reaction product of pyromellitic acid dianhydride, ferrous chloride, ammonium molybdate and urea.

5. The process of claim 1, wherein the polymeric binder is selected from the group consisting of polytetrafluoroethylene, polyethylene, polystyrene and polyacrylonitrile.

6. The process of claim 1, wherein the hydrophobic polymer is selected from the group consisting of polytetrafluoroethylene, polyethylene, polystyrene and polyacrylonitrile.

7. The process of claim 1, wherein both polymeric binder and hydrophobic polymer are the same material and are selected from the group consisting of polytetrafluoroethylene, polyethylene, polystyrene and polyacrylonitrile.

8. The process of making a self-breathing composite air electrode for use as a cathode in fuel cells containing an acid electrolyte, the said process comprising combining polyparaphenyl or a cobalt-, copper-, nickel- or iron-phthalocyanine with a finely divided carbon, a pulverulent organic polymeric binder and an inorganic water-soluble salt as pore-forming agent; then compressing the mixture into a compact structure; separately mixing a hydrophobic organic polymer with a pore-forming agent, compacting the latter mixture into a second compact structure; sintering the two compact structures together so as to bond one structure to the other; and dissolving the pore-forming agent out of the structures prior to or after the sintering whereby a porous electrode is obtained having one hydrophilic and one hydrophobic face.

9. The process of claim 8, wherein the phthalocyanine is polymeric iron phthalocyanine.

References Cited

UNITED STATES PATENTS

| | | | |
|---|---|---|---|
| 3,617,388 | 11/1971 | Matsuda et al. | 136—120 FC |
| 3,410,727 | 11/1968 | Jasinski | 136—86 |
| 3,585,079 | 6/1971 | Richter et al. | 136—120 FC |
| 3,097,116 | 7/1963 | Moos | 136—120 FC |
| 3,177,097 | 4/1965 | Beals | 136—86 DD |
| 3,385,736 | 5/1968 | Deibert | 264—49 X |
| 3,533,851 | 10/1970 | Adlhart et al. | 136—86 D |

FOREIGN PATENTS

| | | | |
|---|---|---|---|
| 935,415 | 8/1963 | Great Britain | 136—120 FC |

OTHER REFERENCES

Drinkard, William C. and John C. Bailar: "Copper Phthalocyanine Polymers," in Journal of The American Chemical Society, vol. 81, Sept. 20, 1959, pp. 4795–4797. QD1A5.

Jasinksi, Raymond: "Cobalt Phthalocyanine As A Fuel Cell Cathode," in Journal of The Electrochemical Society, vol. 112, May 1965, pp. 526–528. TP250A545.

PHILIP E. ANDERSON, Primary Examiner

U.S. Cl. X.R.

136—120 FC; 264—126